(12) United States Patent
Pauly et al.

(10) Patent No.: US 9,444,736 B2
(45) Date of Patent: Sep. 13, 2016

(54) SELECTING AN INTERFACE FOR PACKET ROUTING BASED ON APPLICATION-LAYER DATA

(71) Applicant: Apple Inc., Cupertino, CA (US)

(72) Inventors: Thomas F. Pauly, Sunnyvale, CA (US); Vincent Lubet, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 14/290,690

(22) Filed: May 29, 2014

(65) Prior Publication Data

US 2015/0350071 A1 Dec. 3, 2015

(51) Int. Cl.
| | |
|---|---|
| H04L 12/28 | (2006.01) |
| H04L 12/741 | (2013.01) |
| H04L 12/927 | (2013.01) |
| H04L 12/751 | (2013.01) |
| H04L 12/54 | (2013.01) |
| H04W 48/18 | (2009.01) |
| H04L 12/725 | (2013.01) |

(52) U.S. Cl.
CPC ........... *H04L 45/74* (2013.01); *H04L 12/5692* (2013.01); *H04L 45/08* (2013.01); *H04L 45/306* (2013.01); *H04L 47/803* (2013.01); *H04W 48/18* (2013.01)

(58) Field of Classification Search
CPC ... H04L 12/741; H04L 12/24; H04L 12/751; H04L 12/94; H04L 45/74; H04L 47/803; H04L 45/08; H04L 12/5692
USPC ........................................................ 370/392
See application file for complete search history.

(56) References Cited

U.S. PATENT DOCUMENTS

| | | | |
|---|---|---|---|
| 8,064,455 B2 | 11/2011 | Masputra et al. | |
| 8,488,609 B2 | 7/2013 | Masputra et al. | |
| 8,514,862 B2 | 8/2013 | Masputra et al. | |
| 8,681,791 B2 | 3/2014 | Masputra et al. | |
| 2005/0111453 A1* | 5/2005 | Mizutani | H04L 12/56 370/390 |
| 2012/0254464 A1* | 10/2012 | Armstrong | H04L 45/24 709/238 |
| 2013/0304616 A1* | 11/2013 | Raleigh | G06Q 20/145 705/34 |

* cited by examiner

*Primary Examiner* — Sai-Ming Chan
(74) *Attorney, Agent, or Firm* — Sterne, Kessler, Goldstein & Fox P.L.L.C.

(57) ABSTRACT

The disclosed embodiments relate to a system for selecting an interface for routing an outbound packet. During operation, the system receives an outbound packet to be routed to a destination address. Next, the system obtains application-layer data associated with the outbound packet, including one or more of a process identifier, an application identifier and a user identifier. The system then selects an interface through which to route the outbound packet based on the application-layer data, and uses the selected interface to route the outbound packet.

20 Claims, 4 Drawing Sheets

SELECTING AN INTERFACE FOR PACKET ROUTING BASED ON APPLICATION-LAYER DATA

RELATED ART

The disclosed embodiments generally relate to computer networks. More specifically, the disclosed embodiments relate to a technique for selecting an interface for routing an outbound packet based on application-layer data, such as an application identifier, an process identifier and a user identifier.

BACKGROUND

Improvements in networking infrastructure have significantly increased the power and reach of computing devices, such as smartphones, tablets, laptops and desktop systems. Applications on these computing devices are presently able to communicate through different networks, such as WiFi networks, cellular data networks, and Ethernet networks, to interact with remote computer systems that provide a wide variety of services. For example, network connectively enables a typical laptop user to: check the local weather; make an online purchase; verify a bank account balance; or remote login to a computer system at work.

However, this increased connectivity also increases the likelihood that sensitive data will be compromised. To reduce the risk of such data integrity problems, it advantageous to be able to control on how data is routed through various networks. For example, it is desirable to ensure that communications with a computer system at work are routed through a secure virtual private network (VPN). In another example, it is desirable for a computing system containing sensitive information (such as credit card numbers) to only allow specific applications on the computer system access external networks. Moreover, note that different organizations may want to enforce different policies regarding how data is routed, so it is desirable to provide a system that facilitates using different routing policies for applications belonging to different organizations.

Hence, what is needed is a system that facilitates controlling how data is routed through networks for different applications.

DETAILED DESCRIPTION

Overview

The disclosed embodiments relate to a system for selecting an interface for routing outbound packets. During operation, the system receives an outbound packet to be routed to a destination address. The system also obtains application-layer data associated with the outbound packet, including one or more of a process identifier, an application identifier and a user identifier. The system then selects an interface through which to route the outbound packet based on the application-layer data, and uses the selected interface to route the outbound packet.

Figure 1:
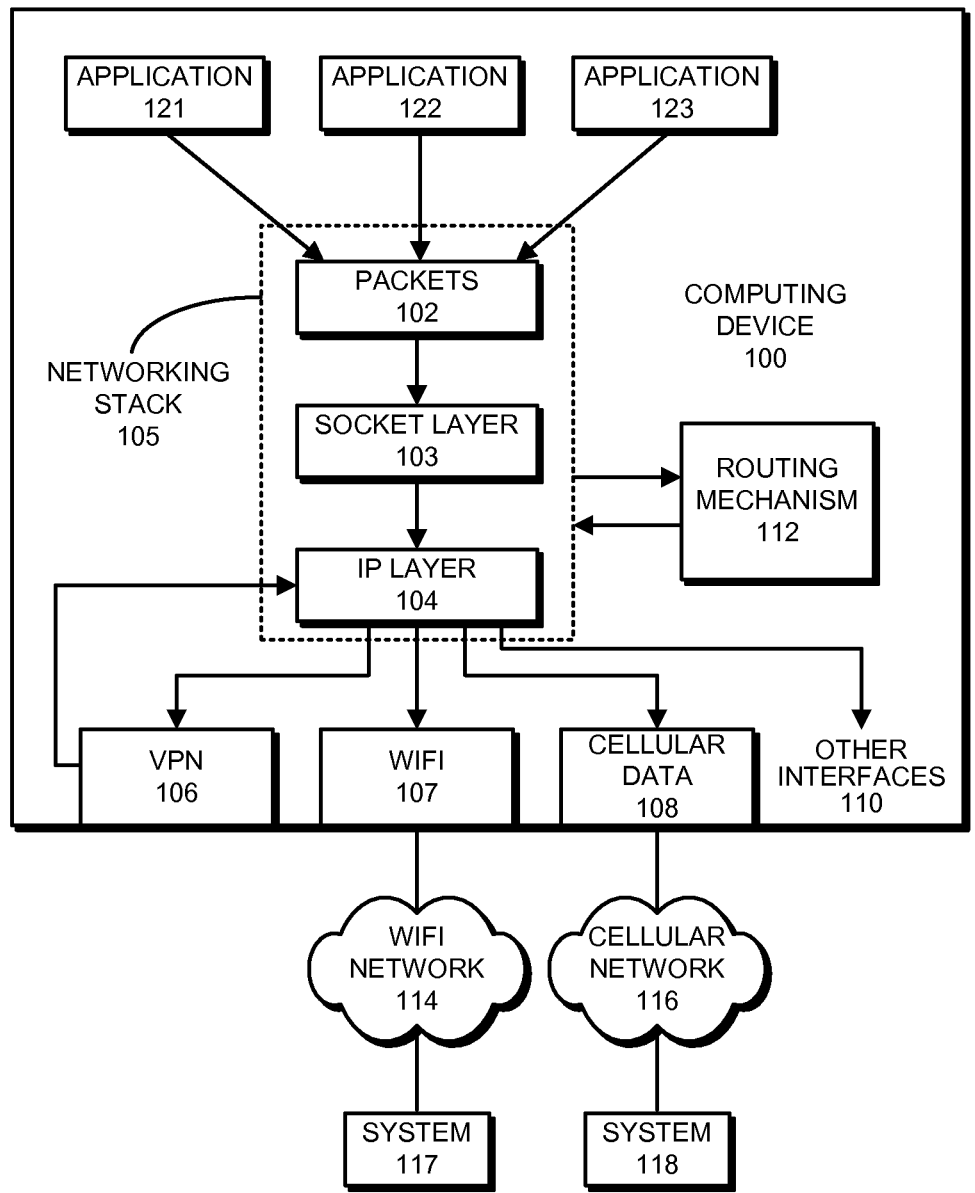
FIG. 1 illustrates a computing device that sends outbound packets through different interfaces in accordance with the disclosed embodiments.

Before describing this system in more detail, we first describe a computer system upon which the system operates.
Computing Device FIG. 1 illustrates a computing device 100 that can send outbound packets through different interfaces in accordance with the disclosed embodiments. Computing device 100 can generally include any type of computer system or computing device that can send can receive packets, including but not limited to, a smart phone, a tablet computer, a laptop computer, a desktop computer or a server computer system. Computing device 100 includes a number of components that are not illustrated in FIG. 1, including: one or more processor cores; one or more memories; a power source, such as a battery or a transformer; various output devices, such as a displays and speakers; various input devices, such a touch screens, pointing devices, and keyboards; and various communication channels, such as an Ethernet port, a WiFi transceiver, and a cellular data transceiver.

To facilitate communications with remote computer systems, such as systems 117-118, computing device 100 includes a networking stack 105, which is responsible for communicating packets 102 between a number of applications 121-123 and various remote computer systems, including systems 117-118. During these communications, packets 102 pass through a socket layer 103 and an IP layer 104 of networking stack 105. Note that socket layer 103 is also referred to as a "transport layer" (layer 4 of the OSI model) that provides various services, such as connection-oriented data stream support, reliability, flow control and multiplexing. IP layer 104 is also referred to as a "network layer" (layer 3 of the OSI model) that is responsible for packet routing and packet forwarding between network segments. Also note that other layers of networking stack 105, namely layers 1, 2, 5, 6 and 7, are not directly involved in selecting an interface during the routing process and are hence not illustrated in FIG. 1.

IP layer 104 routes outbound packets through various interfaces. These interfaces can include "conventional interfaces" implemented in hardware, such as interfaces 107 and 108. They can also include "virtual interfaces," such as interface 106, which are implemented in software, and which are used to process packets, for example by encrypting them, before they are sent out on a conventional hardware interface. More specifically, as illustrated in FIG. 1, IP layer 104 can route outbound packets through a WiFi interface 107 into an associated WiFi network 114 to a destination address in a remote system 117. Alternatively, IP layer 104 can route outbound packets through a cellular data interface 108 into an associated cellular network 116 to a destination address in a remote system 118. IP layer 104 can also route outbound packets through a virtual interface, such as VPN interface 106, that performs various encryption operations on the packet and returns the packets to IP layer 104 to be forwarded to a remote destination through another interface, for example through WiFi interface 107. Note that virtual interfaces can perform other operations, such as multiplexing. IP layer 104 can also route outbound packets through other interfaces 110, such as Ethernet interfaces or interfaces for cellular services, such as voicemail or voice calls.

During the routing process, routing mechanism 112 gathers various application-related data from networking stack 105 and uses this data to make routing decisions that are communicated to networking stack 105. Different embodiments of routing mechanism 112 are described in more detail below with reference to FIGS. 2-4.

The following disclosure describes how outbound packets are routed, but mentions very little about how inbound packets are routed. Inbound packets are typically received in response to the outbound packets and these inbound packets generally return on the same interface as the corresponding outbound packets were sent out on. Upon receiving an inbound packet, the system can validate that the inbound packet returned on the same interface as an associated outbound packet was sent out on.

Existing Routing Mechanism

Figure 2:
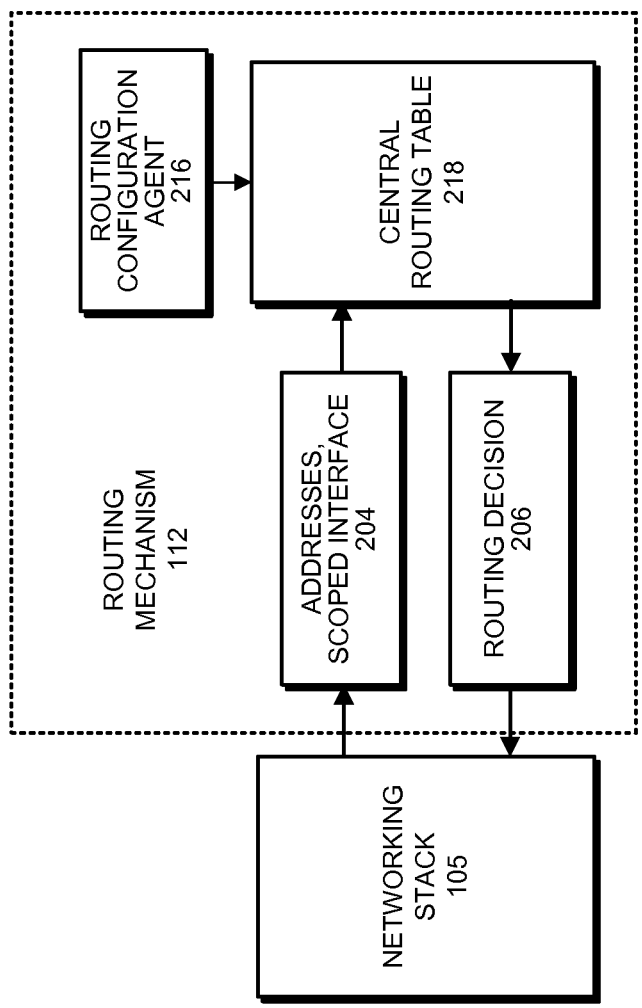
FIG. 2 presents a block diagram illustrating various components of a routing mechanism that makes routing decisions in accordance with the disclosed embodiments.

FIG. 2 presents a block diagram illustrating various components of an existing routing mechanism 112 that facilitates routing decisions in accordance with the disclosed embodiments. Existing routing mechanism 112 is described in more detail in U.S. Pat. No. 8,681,791, entitled "Outbound Transmission of Packet Based on Routing Search Key Constructed from Packet Destination Address and Outbound Interface" by inventors Cahya Masputra, et al., filed on Nov. 10, 2011 the contents of which are hereby incorporated by reference.

Within existing routing mechanism 112, a single configuration agent 216 is responsible for setting up a central routing table 218. During operation, central routing table 218, which is referenced by the networking stack 105, receives address and interface inputs, and responds with a routing decision specifying which addresses and interfaces to use.

More specifically, routing mechanism 112 receives a number of inputs 204, including one or more addresses and an optional scoped interface, wherein the scoped interface identifies an interface that an application wants to scope a packet to. The one or more addresses can include: (1) a remote IP address; and (2) an optional local IP address. The optional local IP address and scoped interface are used to specify which interface (connection to the network) should be used to send the traffic out. If these are not specified, the default interface for the remote address will be selected. Routing mechanism 112 produces a routing decision 206 that specifies a final remote and local IP address pair, as well as the interface to send the packet out on.

Routing mechanism 112 can be configured by a single party, such as routing configuration agent 216, which specifies all of the available routes on each interface, and also specifies which interface is the default route. This information is stored in central routing table 218.

Note that the inputs for each routing request are entirely under the control of the application creating the request. This application specifies the address or addresses it wants to use, and optionally the interface it wants to scope its packets to.

Routing Mechanism

Figure 3:
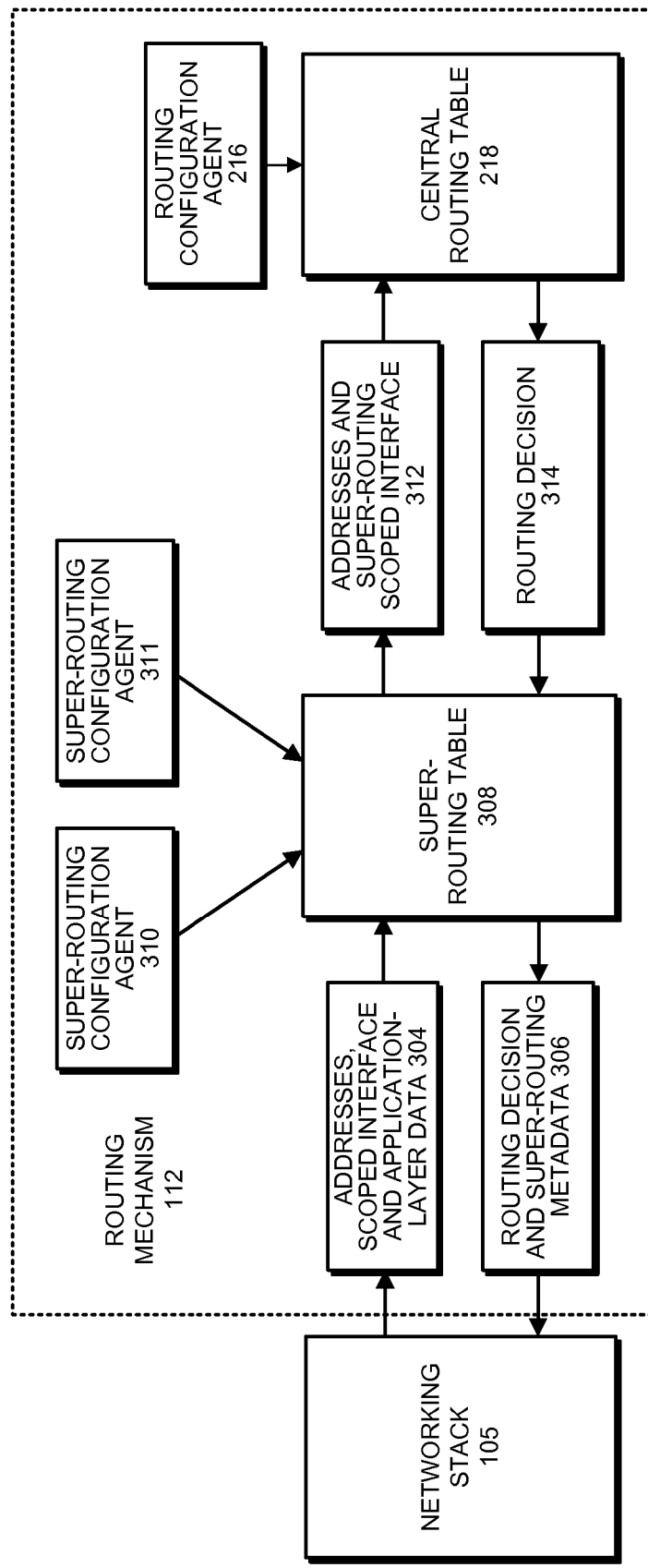
FIG. 3 presents a block diagram illustrating various components of a super-routing mechanism that makes routing decisions in accordance with the disclosed embodiments.
Figure 4:
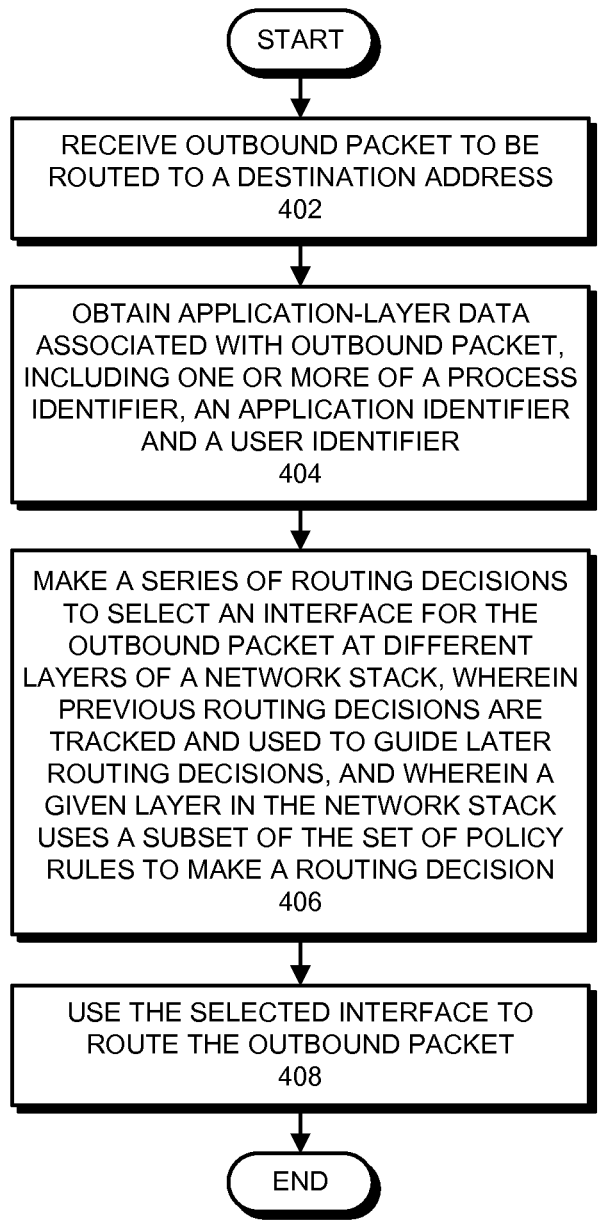
FIG. 4 presents a flowchart illustrating how an interface is selected for an outbound packet in accordance with the disclosed embodiments.

FIG. 3 illustrates how routing the mechanism 112 illustrated in FIG. 2 can be modified by inserting additional functionality in accordance with the disclosed embodiments. This additional functionality refines the routing decisions and enables other parties to specify rules for the routing decisions. The resulting process is referred to as "super-routing," because it creates a layer of routing around the existing routing mechanism described above.

FIG. 3 illustrates how a super-routing table 308 can be introduced into the system illustrated in FIG. 2 to act as an intermediary between networking stack 105 and central routing table 218. Note that this super-routing table 308 can be configured by multiple super-routing configuration agents 311-312, which are distinct from the routing configuration agent 216 that configures central routing table 218.

In comparison to the existing routing process described above, the super-routing process receives a larger set of inputs, which are translated into a chosen interface (referred to as a "super-routing scoped interface") that is combined with the packet addresses to form a set of data 312 that is sent to central routing table 218. The routing decision 314 decision passed back from central routing table 218 is appended with metadata specific to super-routing table 308 to form a set of data 306 that is sent to the networking stack 115.

This new super-routing process facilitates a number of useful capabilities and features that are described in more below, including: (1) an extensible list of routing inputs, (2) configuration by multiple agents, and (3) context-based routing evaluations.

Routing Inputs

As mentioned above, addresses and application-requested interfaces are the only inputs into the routing decision in the existing model illustrated in FIG. 2. The mechanism for super-routing evaluates sockets and packets before they are evaluated by central routing table 218, and can hence evaluate a larger set of input parameters than were previously available. Based on this larger set of input parameters, the super-routing mechanism can choose to: (1) drop traffic, (2) allow the existing routing mechanism to apply its default logic, or (3) reset the scoped interface value to force the traffic through a new path in the existing routing mechanism. Note that the existing routing mechanism associated with central routing table 218 remains unchanged, and the super-routing mechanism can use an extensible number of inputs to influence the routing decision. This new routing mechanism has the advantage of retaining the optimizations of the existing routing mechanism, while allowing for more nuanced decisions.

The new input parameters can include both application-based inputs and user-based inputs. The application-based inputs include unique application identifiers and process identifiers. This facilitates application-based routing, in which certain interfaces or virtual interfaces are available to only some applications, and all or some of the traffic from those applications can be directed into the interfaces. Process identifiers allow the routing policy to identify a particular instance of a process, while the unique application identifiers allow the policy to identify which binary executable is being used.

The user-based inputs include a user identifier. This facilitates user-specific routing, wherein, for example, all traffic from a specific user can be sent to a certain interface or virtual interface, while traffic from other users goes out the default route. For example, the user identifier can be used to differentiate between an application being run by privileged root user, and an application being run by a normal unprivileged user. In this case, the user identifier can be used to validate that only root processes are allowed to use certain interfaces, while all other processes are required, for example, to use a virtual interface.

Other attributes that can be used as inputs include: (1) traffic classes related quality of service, (2) protocols, (3) domain names, (4) account names, and (5) privileges.

The above-described input parameters that the system uses to augment routing decisions are mostly obtained from the socket, within the kernel context. For example, the process ID, application unique ID, user ID, traffic class, and bound interface can be obtained from the socket. However, there are other input parameters that require inputs obtained from outside the kernel, namely a domain, such as the hostname www.apple.com, and an account, such as user@mail.apple.com. In some embodiments, these routing inputs are set onto the socket by applications if they need to match routing rules based on, for example, a domain. Note that because these routing inputs are set onto the socket, we still evaluate them within the context of the kernel.

Configuration

In the existing routing mechanism that appears in FIG. 2, all routing configuration is typically handled by a single writer. Moreover, central routing table 218 is treated as a central set of all available routes on the system, and it is up to an individual process to choose which interface it will request, and therefore which routing result it will receive. On a system in which processes are largely ignorant of the networking stack, however, almost all processes end up using the default route.

The new input parameters used in super-routing allow for certain sets of routing rules to apply to specific users or processes rather than the system as a whole, opening up opportunities for multiple routing configuration agents.

There still exits a single writer 216 for the existing central routing table 218, which defines the master list of all available interfaces, but other writers, such as super-routing configuration agents 310 and 311 can publish rules into the super-routing table 308. Note that the system can provide a protocol that enables these super-routing configuration agents 310 and 311 to create these rules, and the system can ensure that the configuration agents are privileged to do so. Also, if multiple rules from super-routing table 308 apply to a given packet, the system can select one of these rules to apply to the packet based on precedence relationships among rules and among the super-routing configuration agents who published the rules.

For example, central routing table 218 can describe three available interfaces, one of which is the default. Moreover, an agent on the system (which may be running a VPN or security service) can decide to configure the super-routing table 308 to always send traffic from a specific set of applications to only one of the interfaces, which may not be the default interface. Any number of these configuring agents can exist, thereby allowing the system to be "carved up" into different sets of applications, each of which uses a different networking path. This removes the burden of choosing networking paths from the individual processes, and allows the system to create a coherent set of routing rules.

Context-Based Evaluation

In the new super-routing system, routing decisions can be made at multiple layers of networking stack 105 and at multiple times during the lifetime of network traffic. For example, super-routing table 308 can be consulted when a process creates or sends data over a socket, and super-routing table 308 may again be consulted when handling the packets generated by this socket at IP layer 104. In the case of virtual interfaces, packets may first enter a virtual interface, and subsequently be sent to another interface that directly accesses the wider network.

The existing routing mechanism does not have any context for its decisions; that is, it returns the same decision for the same address inputs at all networking layers, as well as during the lifetime of network traffic through the system. In contrast, the new super-routing technique tracks decisions across the networking layers and throughout the lifetime of network traffic and can make different routing decisions at different layers.

Context across layers is facilitated by tracking previous routing decisions and using them to guide subsequent routing decisions. These previous routing decisions can be stored in metadata that follows each packet. Moreover, the use of the previous routing decisions is required due to the limited availability of the new super-routing input parameters at lower layers of the stack. The originating process parameters, for example, are available from the socket created by the process. When the process sends data through a socket, the super-routing mechanism handles the data before passing it to the existing routing mechanism, and can record metadata about its decision on all packets leaving that socket. Later, when the packet is processed by lower layers, such as the IP layer 104, the super-routing mechanism will be able to use the previous routing decision marked on the packet to influence its new decision.

In some embodiments, the system does not keep track of the full history of rules applied to a packet, just the last rule. However, because the chains of rules are set up to only describe unique paths, the system does not need to keep a history of rules because the history implied by the last rule. That is, if there are two chains of rules across layers (A→B→C) and (D→E→F), and C and F are equivalent decisions, we do not combine C and F, but instead have a unique rule for each path that leads to a decision.

In some embodiments, the system provides different lists of rules for each layer. For example, socket layer 103 and IP layer 104 can have different rules, which are "compiled" from a master list of rules that the configuration agents 310-311 set up. The reason for maintaining separate lists of rules is to increase performance. There is no need traverse a list of rules at the IP layer which only apply to the socket layer. Instead, we only need rules that can be tracked with metadata results and IP-layer-only inputs at the IP layer.

The super-routing mechanism facilitates flexibility to make the same decision at both socket and IP layers, or alternatively can make a different decision at the IP layer based on the decision at the socket layer. Note that the context information specifying previous routing decisions can passed along with packets in the form of super-routing-specific metadata, rather than marking every packet with the full content of the upper layer's application-related parameters. This allows the system to remain optimized, while being able to evaluate a large number of properties at the upper layer.

The super-routing mechanism uses context information associated with previous routing decisions to influence the path of a packet through various interfaces before ultimately leaving the device. As with cross-layer contextual information, this contextual information can be passed through metadata specific to super-routing. For example, a packet may be sent to a virtual interface (e.g., a VPN interface) based on rules in the super-routing table, at which point the packet will be marked with metadata indicating that it passed through this interface. After passing through the virtual interface, if the packet gets re-injected into the networking stack, the metadata can be used by the super-routing mechanism to make a different routing decision, and can send the packet to a non-virtual interface.

Taken as a whole, context-based routing evaluation allows for more complex and deterministic paths through the networking stack.

Routing Process

FIG. 3 presents a flowchart illustrating the process of selecting an interface for an outbound packet in accordance with the disclosed embodiments. First, the system receives an outbound packet to be routed to a destination address (step 402). Next, the system obtains application-layer data associated with the outbound packet, including one or more of a process identifier, an application identifier and a user identifier (step 404). The system then makes a series of routing decisions to select the interface at different layers of a network stack, wherein previous routing decisions are tracked and used to guide later routing decisions, and wherein a given layer in the network stack uses a subset of a set of policy rules to make a routing decision (step 406). Finally, the system uses the selected interface to route the outbound packet.

EXAMPLE

The path of an exemplary packet through the outbound path can be described as follows. Before the packet is transmitted, a number of rules are configured to implement a routing policy. In this example, whenever an application (in this example, the Safari™ browser), sends data to address range 10.0.0.0-10.0.0.255, the data needs to go through VPN interface 106 before it goes out WiFi interface 107. At the different layers of networking stack 105, the system uses different routing rules. At the top-layer, the system applies policy A, which specifies that outbound packets from the Safari™ browser in the address range 10.0.0.0-10.0.0.255 should be directed to VPN interface 106. Then, when the system subsequently sees metadata in the packet indicating that policy A has already been matched, the system sends the packet through VPN interface 106. This is policy B. Then, when the system subsequently see that policy B has been matched, which means that the packet has already been sent through VPN interface 106, the system sends the packet out WiFi interface 107. This is policy C.

After these policy rules have been configured, suppose Safari connects a TCP socket to address 10.0.0.1. When Safari sends an outbound packet to the socket, the packet matches policy A at the socket layer, so the packet is scoped to VPN and an identifier for policy A is saved in metadata that follows the packet. The system then evaluates the packet using central routing table 218. However, the packet has been scoped to the VPN interface 106, so central routing table 218 agrees to send the packet through the VPN interface 106.

Then, the packet goes down to IP layer 104. Note that while the packet is in IP layer 104, the packet is outside of the context of the application, and the application-layer data for the packet, such as the application ID, process ID and user ID, are not available. Within IP layer 104, the packet's policy metadata is checked again. The system determines that policy A has already been applied, and although the application-layer data no longer available, the system knows the packet has already matched the rule for policy A. So, the system applies policy B and sends the packet to VPN interface 106 and also records the fact that policy B has been applied in the packet's metadata. VPN interface 106 then performs various operations on the packet including encryption and returns the packet to IP layer 104.

When the packet returns from VPN interface 106 to IP layer 104, the system sees that policy B has already been applied to the packet, and applies policy C, which scopes the packet for WiFi interface 107. Finally, central routing table 218 sees the packet is scoped for WiFi interface 107 and sends the packet out through the WiFi interface 107.

The detailed description that appears above is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a system reads and executes the code and/or data stored on the non-transitory computer-readable storage medium, the system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Moreover, the foregoing descriptions of disclosed embodiments have been presented only for purposes of illustration and description. They are not intended to be exhaustive or to limit the disclosed embodiments to the forms disclosed. Accordingly, many modifications and variations will be apparent to practitioners skilled in the art.

Additionally, the above disclosure is not intended to limit the disclosed embodiments. The scope of the disclosed embodiments is defined by the appended claims.

What is claimed is:

1. A computer-implemented method for selecting an interface for packet routing, comprising:
    enabling a plurality of configuration agents to contribute a policy rule to a set of policy rules;
    receiving an outbound packet to be routed to a destination address;
    selecting the interface through which to transmit the outbound packet based at least in part on a policy rule from the set of policy rules; and
    transmitting the outbound packet via the selected interface.

2. The computer-implemented method of claim 1, further comprising:
    obtaining application-layer data associated with the outbound packet from a network socket for the outbound packet, wherein the application-layer data comprises a process identifier, an application identifier, and a user identifier; and selecting the interface based at least in part on the application-layer data.

3. The computer-implemented method of claim 1, wherein the selecting the interface comprises:

making a series of routing decisions at different layers of a network stack; and tracking previous routing decisions, wherein the previous routing decisions are used to guide later routing decisions.

4. The computer-implemented method of claim 1, further comprising:

determining that multiple policy rules from the set of policy rules apply to the outbound packet; and selecting one of the multiple policy rules to apply to the outbound packet based at least in part on precedence relationships in the set of policy rules.

5. The computer-implemented method of claim 1, wherein a type of the selected interface comprises:

a WiFi interface;
an Ethernet interface;
a cellular data interface;
a cellular service interface; or
a virtual interface.

6. The computer-implemented method of claim 2, wherein the application-layer data further comprises:

a traffic class;
a protocol;
a domain name:
an account name; or
a privilege.

7. A non-transitory computer-readable storage medium having instructions stored therein, which when executed by a processor cause the processor to perform operations for selecting an interface for packet routing, the operations comprising:

receiving an outbound packet to be routed to a destination address;

selecting the interface through which to transmit the outbound packet based at least in part on a policy rule from a set of policy rules, wherein the selecting comprises:

determining that multiple policy rules from the set of policy rules apply to the outbound packet; and applying the policy rule of the set of policy rules to the outbound packet based at least in part on precedence relationships in the set of policy rules; and using the selected interface to transmit the outbound packet.

8. The non-transitory computer-readable storage medium of claim 7, further comprising:

obtaining application-layer data associated with the outbound packet from a network socket for the outbound packet, wherein the application-layer data comprises a process identifier, an application identifier, and a user identifier; and selecting the interface based at least impart on the application-layer data.

9. The non-transitory computer-readable storage medium of claim 7, wherein the selecting the interface operation comprises:

making a series of routing decisions at different layers of a network stack; and tracking previous routing decisions, wherein the previous routing decisions are used to guide later routing decisions.

10. The non-transitory computer-readable storage medium of claim 7, wherein the operations further comprise: enabling a plurality of configuration agents to contribute policy rules to the set of policy rules.

11. An electronic device, comprising:

one or more processors configured to:

enable a plurality of configuration agents to contribute a policy rule to a set of policy rules;

receive an outbound packet to be routed to a destination address;

obtain application-layer data associated with the outbound packet, wherein the application-layer data comprises one or more of a process identifier, an application identifier, and a user identifier;

make a routing decision for the outbound packet based at least in part on the policy rule or the application-layer data; and use the routing decision to communicate the outbound packet to the destination address.

12. The electronic device of claim 11, wherein to make the routing decision for the outbound packet the one or more processors are configured to select an interface through which to transmit the outbound packet.

13. The electronic device of claim 11, wherein the one or more processors are configured to obtain the application-layer data from a network socket for the outbound packet.

14. The electronic device of claim 11, wherein to make the routing decision, the one or more processors are configured to:

track a previous routing decision; and select an interface at different layers of a network stack based at least in part on the previous routing decision.

15. The computer-implemented method of claim 3, wherein the making the series of routing decisions is based at least in part on a first policy rule of a first layer and a second policy rule of a second layer, wherein the first and second policy rules are in the set of policy rules, and wherein the first and second layers are different layers of the network stack.

16. The computer-implemented method of claim 3, wherein the tracking the previous routing decisions comprises transmitting metadata specifying the previous routing decisions with the outbound packet.

17. The non-transitory computer-readable storage medium of claim 9, wherein the making the series of routing decisions is based at least in part on a first policy rule of a first layer and a second policy rule of a second layer, wherein the first and second policy rules are in the set of policy rules, and wherein the first and second layers are different layers of the network stack.

18. The non-transitory computer-readable storage medium of claim 9, wherein the tracking the previous routing decisions comprises transmitting metadata specifying the previous routing decisions with the outbound packet.

19. The electronic device of claim 14, wherein the set of policy rules comprise a first policy rule of a first layer and a second policy rule of a second layer, and wherein the first and second layers are different layers of the network stack.

20. The electronic device of claim 14, wherein to track the previous routing decision, the one or more processors are configured to transmit metadata specifying the previous routing decision with the outbound packet.

* * * * *